(12) United States Patent
Nakamura et al.

(10) Patent No.: US 8,743,469 B2
(45) Date of Patent: Jun. 3, 2014

(54) ZOOM LENS AND IMAGE PICKUP APPARATUS INCLUDING THE SAME

(75) Inventors: Tomoyuki Nakamura, Utsunomiya (JP); Shoichi Takemoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/446,234

(22) Filed: Apr. 13, 2012

(65) Prior Publication Data

US 2012/0262608 A1 Oct. 18, 2012

(30) Foreign Application Priority Data

Apr. 15, 2011 (JP) ................................. 2011-090965

(51) Int. Cl.
*G02B 15/14* (2006.01)

(52) U.S. Cl.
USPC ............ 359/676; 359/681; 359/684; 359/678

(58) Field of Classification Search
USPC .......................... 359/676, 681, 684, 678, 688
See application file for complete search history.

(56) References Cited

U.S. PATENT DOCUMENTS

| 4,874,231 A | 10/1989 | Aono |
| 5,917,658 A | 6/1999 | Yamanashi |
| 2009/0128923 A1* | 5/2009 | Toyama ........................ 359/683 |
| 2010/0214658 A1* | 8/2010 | Ito ................................. 359/557 |

FOREIGN PATENT DOCUMENTS

| JP | 1989-126614 A | 5/1989 |
| JP | 1996-234105 A | 9/1996 |
| JP | 2005-309061 A | 11/2005 |
| JP | 2009-128491 A | 6/2009 |

* cited by examiner

*Primary Examiner* — Scott J Sugarman
*Assistant Examiner* — Mustak Choudhury
(74) *Attorney, Agent, or Firm* — Rossi, Kimms & McDowell, LLP

(57) ABSTRACT

A zoom lens includes a first lens unit having a positive refractive power which does not move for zooming; a second lens unit having a negative refractive power which moves during zooming; a third lens unit having a negative refractive power which moves during zooming; a fourth lens unit having a positive refractive power which moves during zooming; and a fifth lens unit having a positive refractive power which does not move for zooming. Air intervals (L2w and L2t) between the second lens unit and the third lens unit at a wide-angle end and at a telephoto end, respectively, an air interval (L3w) between the third lens unit and the fourth lens unit at the wide-angle end, a focal length (f1) of the first lens unit, and a combined focal length (f23w) of the second lens unit and the third lens unit at the wide-angle end are appropriately set.

8 Claims, 7 Drawing Sheets

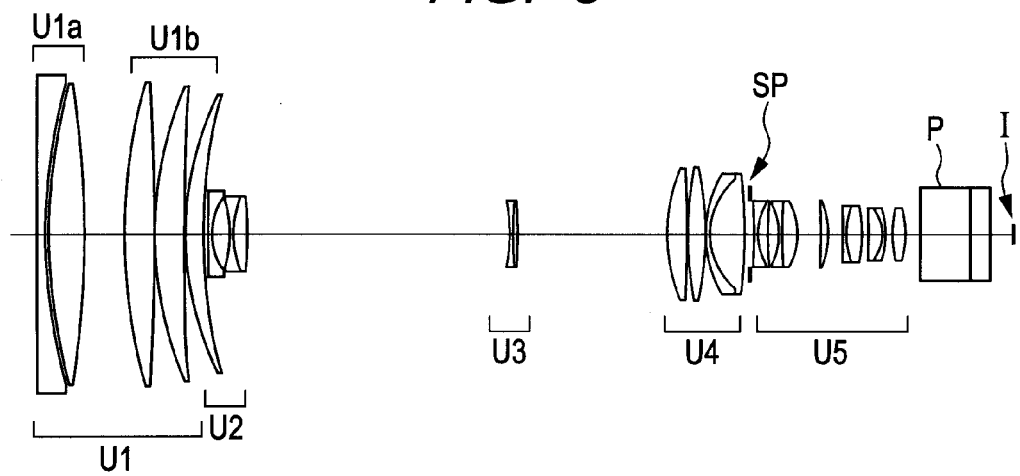
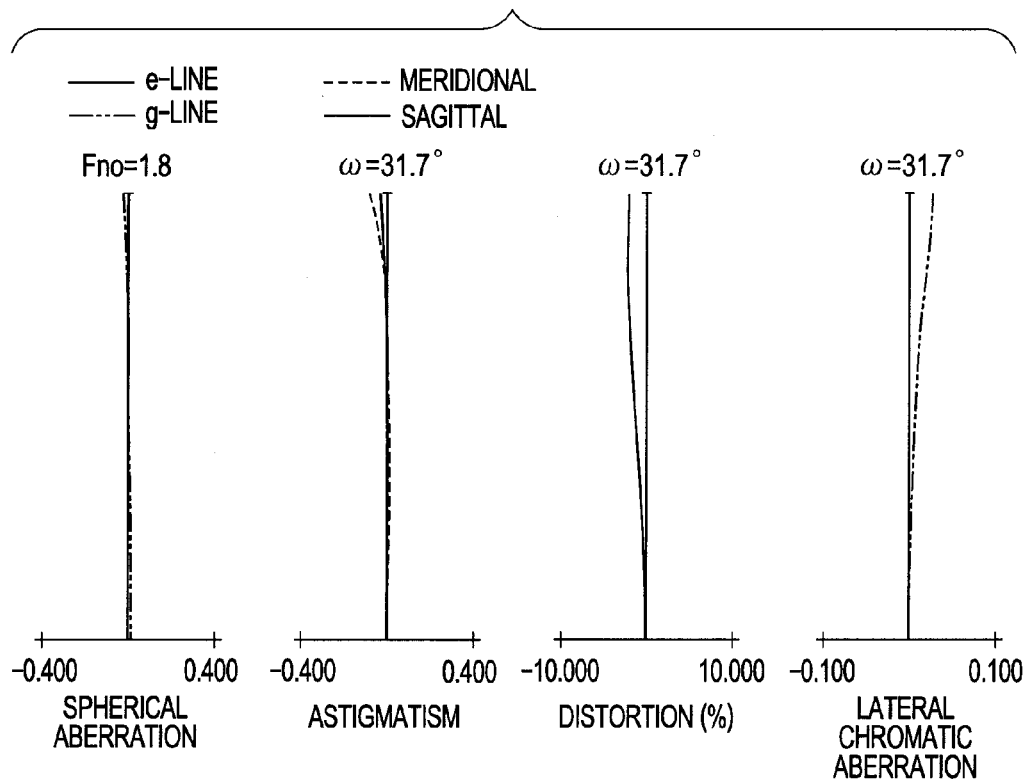

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for a broadcasting television camera, a video camera, a digital still camera, a surveillance camera and a silver-halide film camera, for example.

2. Description of the Related Art

In recent years, a zoom lens having a wider angle of field, a high zoom ratio, and high optical performance is required for an image pickup apparatus such as a television camera, a silver halide film camera, a digital camera, or a video camera. As a zoom lens having a wider angle of field and a high zoom ratio, there is known a positive lead type five-unit zoom lens comprising five lens units including a positive refractive power lens unit disposed on the most object side. As this positive lead type zoom lens, there is known a five-unit zoom lens, in which a magnification-varying lens unit having functions as a variator and a compensator is constituted of three movable lens units, which move in different loci.

For instance, there is known a five-unit zoom lens suitable for a television camera, in which three movable lens units including a second lens unit having a negative refractive power, a third lens unit having a positive refractive power and a fourth lens unit having a positive refractive power perform magnification-varying and correction of image plane variation due to the magnification-varying (Japanese Patent Application Laid-Open No. 2009-128491). Other than that, there is known a five-unit zoom lens suitable for a television camera, in which three movable lens units including a second lens unit having a negative refractive power, a third lens unit having a negative refractive power and a fourth lens unit having a positive refractive power perform magnification-varying and correction of image plane variation due to the magnification-varying (Japanese Patent Application Laid-Open No. H01-126614 and Japanese Patent Application Laid-Open No. H08-234105).

Japanese Patent Application Laid-Open No. 2009-128491 discloses a zoom lens having a zoom ratio of approximately 54 and an angle of field of approximately 60 degrees at a wide-angle end. Japanese Patent Application Laid-Open No. H01-126614 discloses a zoom lens having a zoom ratio of approximately 5 and an angle of field of approximately 66 degrees at a wide-angle end. Japanese Patent Application Laid-Open No. H08-234105 discloses a zoom lens having a zoom ratio of approximately 2.5 and an angle of field of approximately 15 degrees at a wide-angle end.

In order to achieve high optical performance while maintaining a wider angle of field and a higher zoom ratio in the five-unit zoom lens, it is important to appropriately set moving conditions of the second, third, and fourth lens units as magnification-varying lens units during zooming and a refractive power of the first lens unit. Other than that, it is important to appropriately set a combined refractive power of the second and third lens units and a moving locus from the wide-angle end to an intermediate zoom position of the third lens unit. If these configurations are not appropriately set, it becomes difficult to achieve a zoom lens having a wider angle of field, a high zoom ratio, and high optical performance over the whole zoom range.

In the zoom lenses disclosed in Japanese Patent Application Laid-Open No. 2009-128491, Japanese Patent Application Laid-Open No. H01-126614 and Japanese Patent Application Laid-Open No. H08-234105, there is a tendency that the front lens effective diameter increases along with an increase of the angle of field and a tendency that variations of various aberrations due to magnification-varying increase. In addition, there is a tendency that a movement amount of a moving lens unit for magnification-varying increases along with an increase of the zoom ratio, and hence the total length of the zoom lens as well as variations of various aberrations due to magnification-varying increase.

SUMMARY OF THE INVENTION

It is an object of the present invention to provide a zoom lens having a wider angle of field and a high zoom ratio, and which is capable of suppressing an increase of aberration variations due to magnification: varying, and to provide an mage pickup apparatus including the zoom lens.

A zoom lens according to the present invention includes, in order from an object side to an image side; a first lens unit having a positive refractive power which does not move for zooming, a second lens unit having a negative refractive power which moves during zooming, a third lens unit having' a negative refractive power which moves during zooming, a fourth lens unit having a positive refractive power which moves during zooming; and a fifth lens unit having a positive refractive power which does not move for zooming, in which the following conditions are satisfied:

$$5 < L2w/L2t < 50;$$

$$0.6 < L2w/L3w < 2.5; \text{ and}$$

$$10 < |f1/f23w| < 25,$$

where $L2w$ and $L2t$ represent air intervals between the second lens unit and the third lens unit at a wide-angle end and at a telephoto end, respectively, $L3w$ represents an air interval between the third lens unit and the fourth lens unit at the wide-angle end, $f1$ represents a focal length of the first lens unit, and $f23w$ represents a combined focal length of the second lens unit and the third lens unit at the wide-angle end.

Further features of the present invention will become apparent from the following description of exemplary embodiments with reference to the attached drawings.

BRIEF DESCRIPTION OF THE DRAWINGS

FIG. 3 is a lens cross-sectional view at a wide-angle end when focusing on an infinite object according to Numerical Embodiment 2 of the present invention.

FIG. 4A is an aberration diagram at the wide-angle end when focusing on an infinite object according to Numerical Embodiment 2.

DESCRIPTION OF THE EMBODIMENTS

Hereinafter, an exemplary embodiment of the present invention is described in detail with reference to the attached drawings. A zoom lens of the present invention includes, in order from an object side to an image side, a first lens unit having a positive refractive power which does not move for zooming, and further includes a second lens unit having a negative refractive power which moves during zooming, a third lens unit having a positive refractive power which moves during zooming and a fourth lens unit having a positive refractive power which moves during zooming. Further, the zoom lens includes a fifth lens unit having a positive refractive power which does not move for zooming.

Herein, the expression that "a lens unit does not move for zooming" means that the lens unit is not driven for a purpose of zooming, but the lens unit may move for focusing if zooming and focusing are performed simultaneously.

Figure 1:
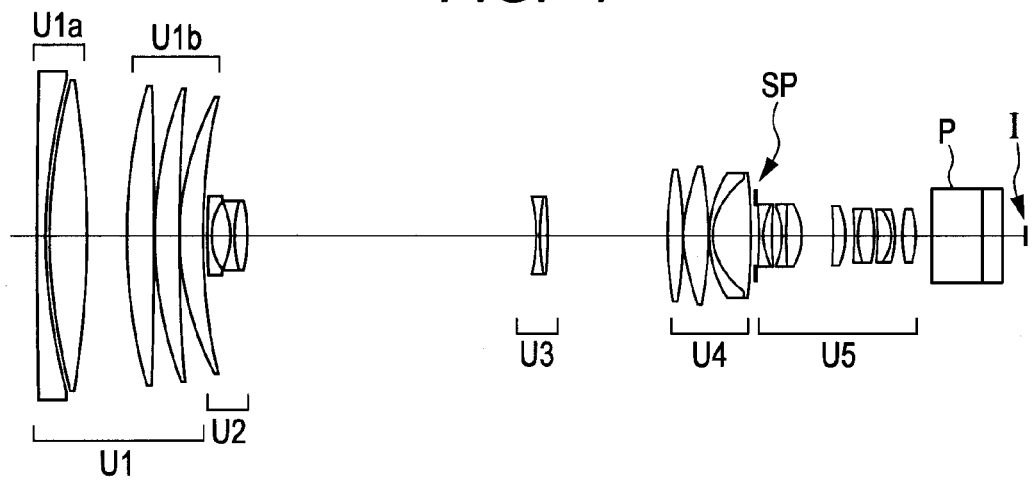
FIG. 1 is a lens cross-sectional view at a wide-angle end when focusing on an infinite object according to Numerical Embodiment 1 of the present invention.
Figure 2A:
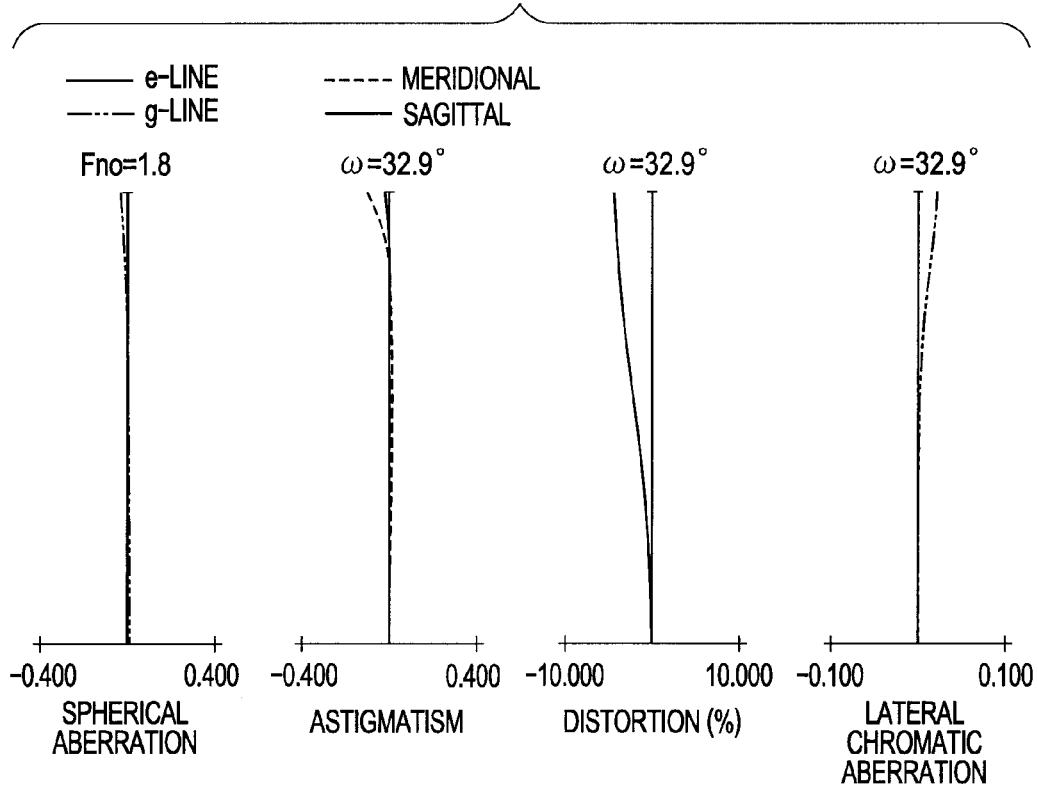
FIG. 2A is an aberration diagram at the wide-angle end when focusing on an infinite object according to Numerical Embodiment 1.
Figure 2B:
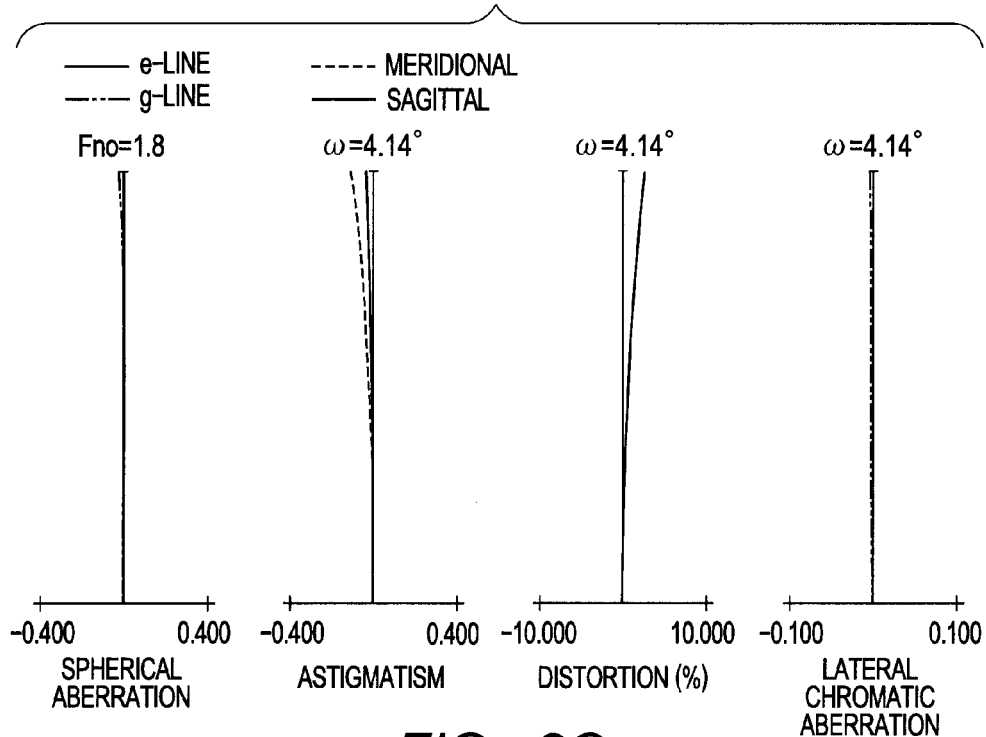
FIG. 2B is an aberration diagram at an intermediate zoom position when focusing on an infinite object according to Numerical Embodiment 1.
Figure 2C:
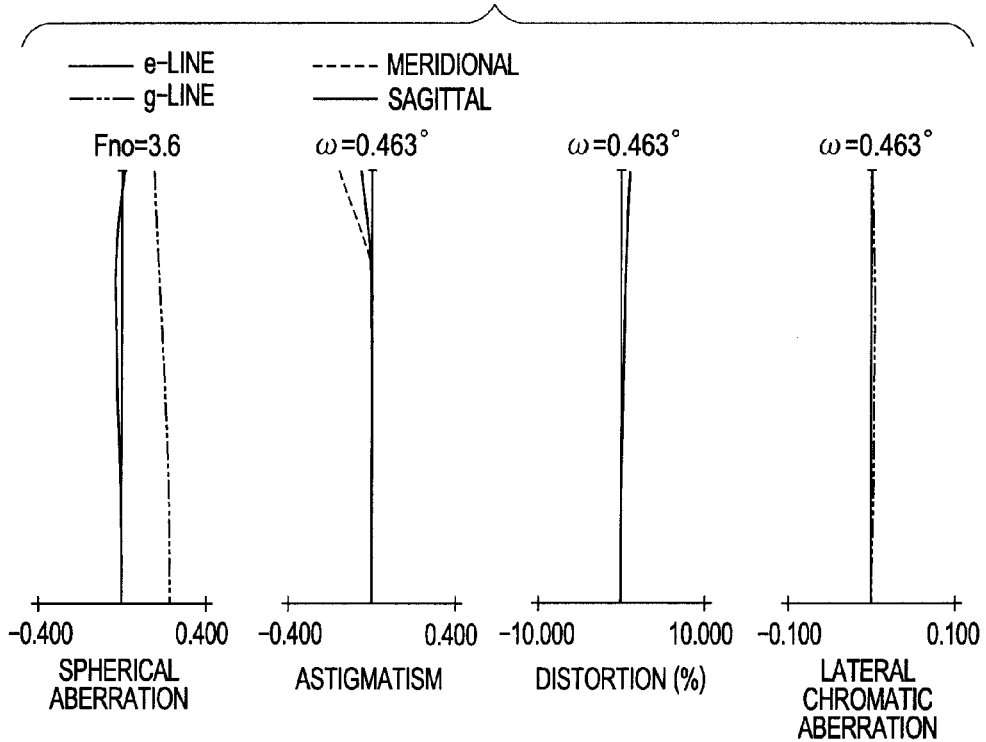
FIG. 2C is an aberration diagram at a telephoto end when focusing on an infinite object according to Numerical Embodiment 1.

FIG. 1 is a lens cross-sectional view of a zoom lens according to Embodiment 1 (Numerical Embodiment 1) of the present invention when focusing on an infinite object at a wide-angle end (focal length f=8.5 mm). FIGS. 2A, 2B and 2C are aberration diagrams respectively at the wide-angle end, at an intermediate zoom position (focal length f=76 mm) and at a telephoto end (focal length f=680 mm) when focusing on an infinite object according to Numerical Embodiment 1. Here, the focal length is a value of this numerical embodiment expressed in millimeters. The same is true for the following examples.

Figure 4B:
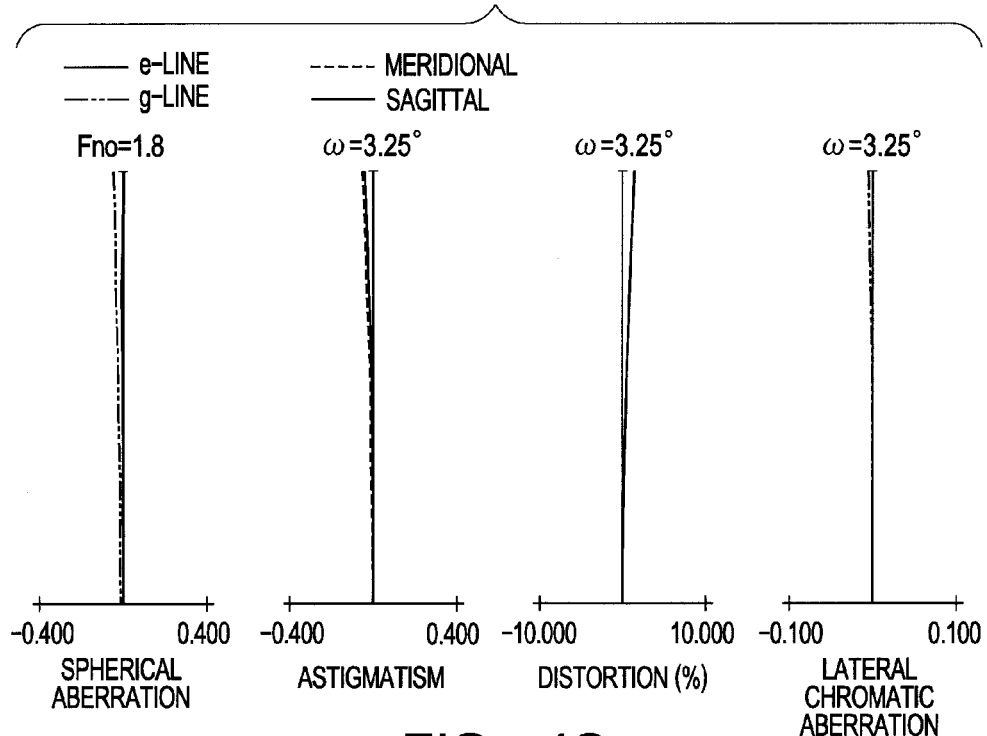
FIG. 4B is an aberration diagram at an intermediate zoom position when focusing on an infinite object according to Numerical Embodiment 2.
Figure 4C:
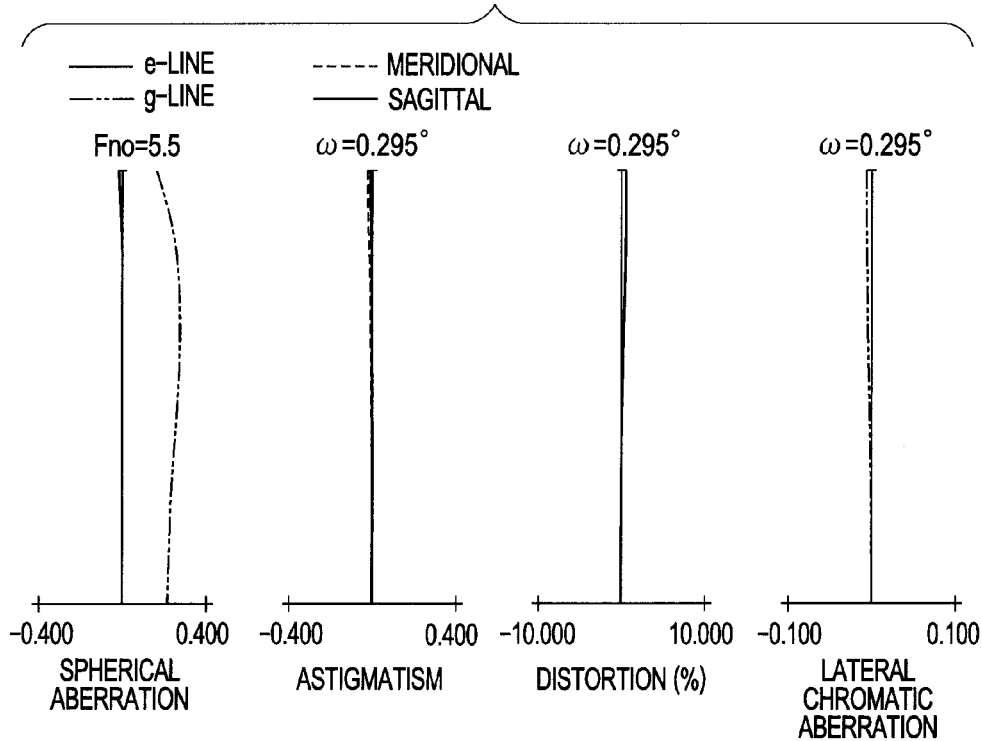
FIG. 4C is an aberration diagram at a telephoto end when focusing on an infinite object according to Numerical Embodiment 2.

FIG. 3 is a lens cross-sectional view of a zoom lens according to Embodiment 2 (Numerical Embodiment 2) of the present invention at a wide-angle end (focal length f=8.9 mm) when focusing on an infinite object. FIGS. 4A, 4B and 4C are aberration diagrams respectively at the wide-angle end, at an intermediate zoom position (focal length f=97 mm) and at a telephoto end (focal length f=1,068 mm) when focusing on an infinite object according to Numerical Embodiment 2.

Figure 5:
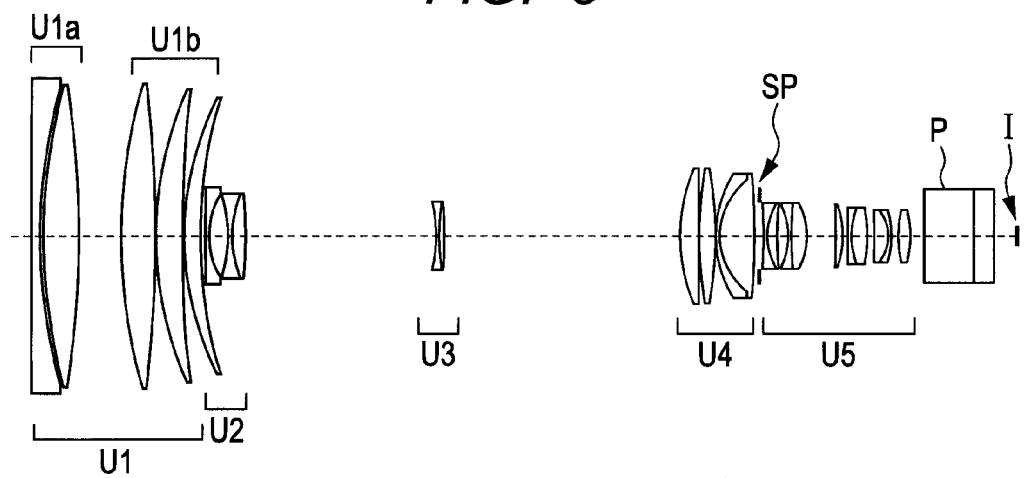
FIG. 5 is a lens cross-sectional view at a wide-angle end when focusing on an infinite object according to Numerical Embodiment 3 of the present invention.
Figure 6A:
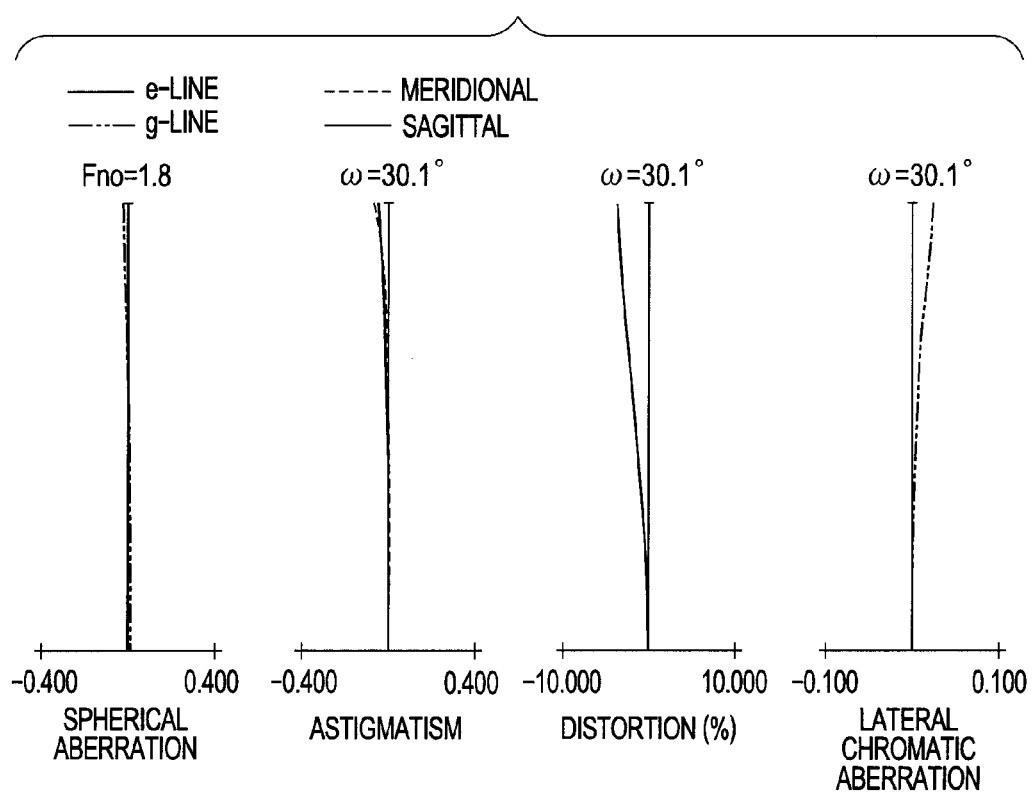
FIG. 6A is an aberration diagram at the wide-angle end when focusing at infinity according to Numerical Embodiment 3.
Figure 6B:
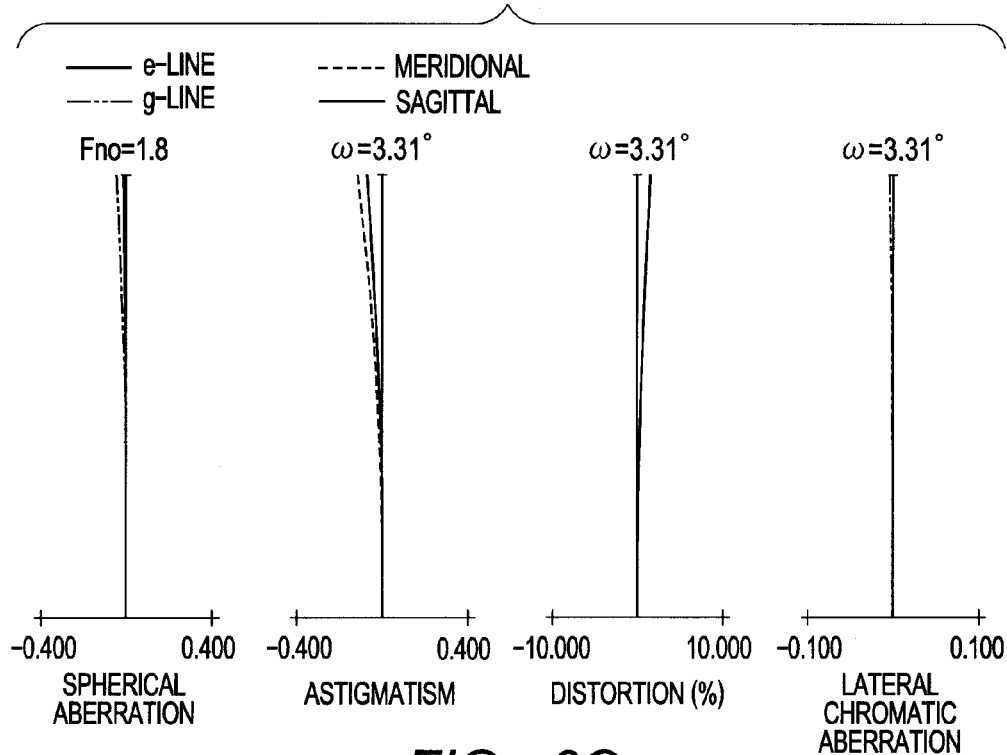
FIG. 6B is an aberration diagram at an intermediate zoom position when focusing at infinity according to Numerical Embodiment 3.
Figure 6C:
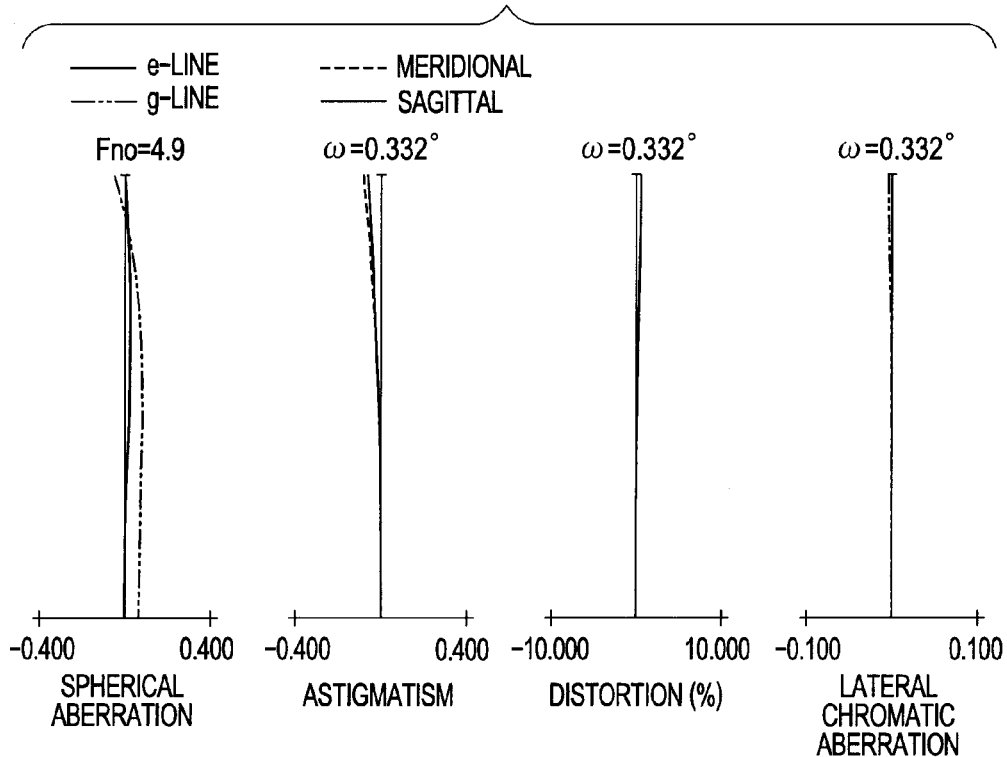
FIG. 6C is an aberration diagram at a telephoto end when focusing at infinity according to Numerical Embodiment 3.

FIG. 5 is a lens cross-sectional view of a zoom lens according to Embodiment 3 (Numerical Embodiment 3) of the present invention at a wide-angle end (focal length f=9.5 mm) when focusing on an infinite object. FIGS. 6A, 6B and 6C are aberration diagrams respectively at the wide-angle end, at an intermediate zoom position (focal length f=95 mm) and at a telephoto end (focal length f=950 mm) when focusing on an infinite object according to Numerical Embodiment 3.

Figure 7:
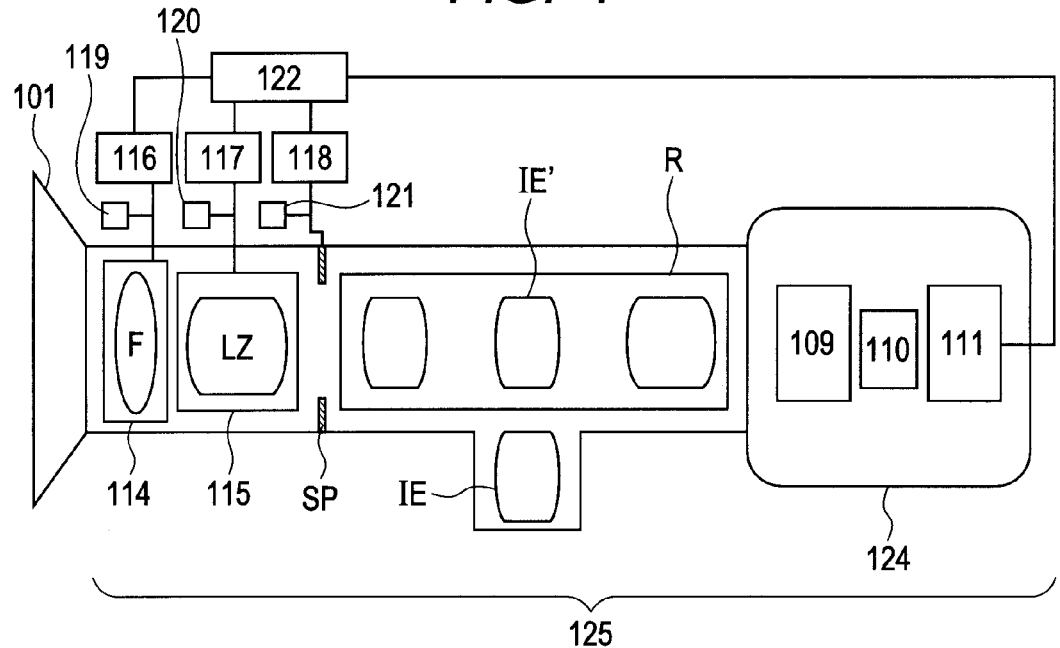
FIG. 7 is a schematic diagram of a principal part of an image pickup apparatus of the present invention.
Figure 8:
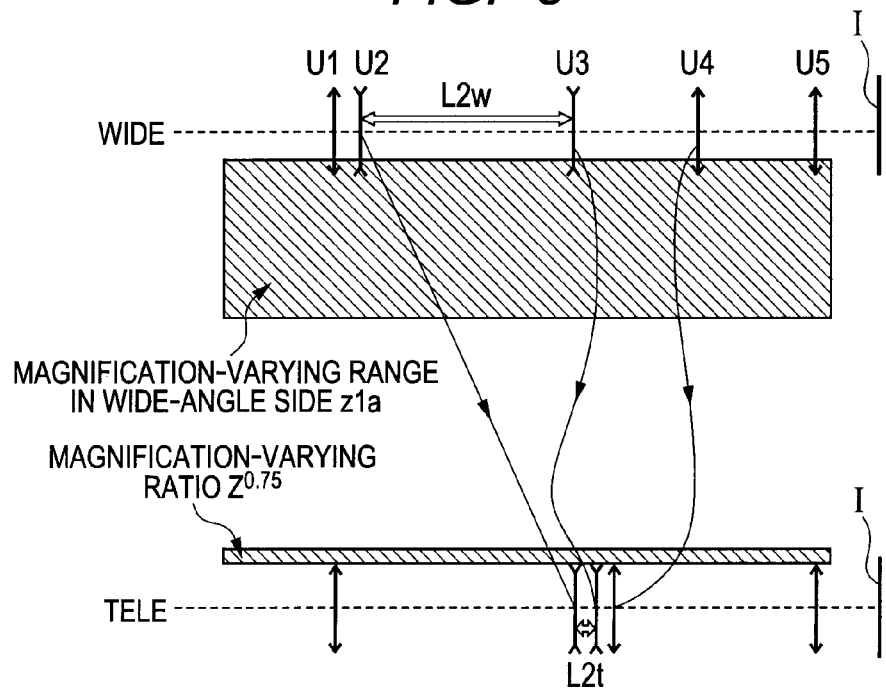
FIG. 8 is a schematic diagram of a refractive power arrangement for a paraxial ray of a zoom lens of the present invention.

FIG. 7 is a schematic diagram of a principal part of an image pickup apparatus of the present invention. FIG. 8 is an explanatory diagram of a refractive power arrangement for a paraxial ray of a zoom lens of the present invention. In each lens cross-sectional view, the left side is a subject (object) side (front), and the right side is the image side (rear). In the lens cross-sectional view, a first lens unit (front lens unit) U1 has a positive refractive power which does not move for zooming. A focus lens unit U1b in the first lens unit U1 moves toward the object side when focusing from an infinite object to a short distance object. A fixed lens unit U1a in the first lens unit U1 does not move for focusing.

Second and third lens units U2 and U3 having a negative refractive power move during zooming. A fourth lens unit U4 having a positive refractive power moves during zooming. A fifth lens unit (imaging lens unit) U5 having a positive refractive power for an image forming action does not move for zooming. The zoom lens of each embodiment moves on an optical axis while changing lens intervals among the second lens unit U2 to the fourth lens unit U4, and hence magnification-varying and correction of image plane variation due to the magnification-varying are performed.

These three lens units constitute a magnification-varying system (magnification-varying lens unit). The zoom lens further includes a stop (aperture stop) SP. A color separation prism P is an optical filter or the like and is illustrated as a glass block in the figures. An image pickup surface I corresponds to an image pickup plane of a solid-state image pickup element (photoelectric transducer) for receiving a subject image formed by the zoom lens and performing photoelectric conversion.

In the aberration diagrams, a solid line and a two-dot dashed line of the spherical aberration diagram indicate aberrations on an e-line and a g-line, respectively. A dotted line and a solid line in the astigmatism diagram indicate aberrations on a meridional image plane and a sagittal image plane, respectively, and a lateral chromatic aberration diagram illustrates an aberration on the g-line. A half angle of field is denoted by ω, and an f-number is denoted by Fno. Note that, in the following embodiments, the wide-angle end and the telephoto end refer to zoom positions at which the magnification-varying lens units are positioned at the ends of their respective mechanically movable ranges on the optical axis.

Moving loci of the second to fourth lens units U2 to U4 for zooming in the zoom lens of each embodiment are described with reference to a schematic diagram of the refractive power arrangement for the paraxial ray in FIG. 8. In FIG. 8, the upper part corresponds to a wide-angle end (WIDE), and the lower part corresponds to a telephoto end (TELE). A solid line from the upper part to the lower part indicates an example of loci of lens units moving during zooming. As illustrated in FIG. 8, when the second lens unit U2 is moved linearly for zooming from the wide-angle end to the telephoto end, the third lens unit U3 has a locus convex toward the image side in a wide-angle side and has a locus convex toward the object side in a telephoto side so as to move along a locus like an inverted S-shape. The fourth lens unit U4 has a locus convex toward the object side in the wide-angle side and moves along a locus like an S-shape, that is, the fourth lens unit U4 moves so as to be closer to the object at the telephoto end than at the wide-angle end.

In each embodiment, the following conditional expressions are satisfied:

$$5 < L2w/L2t < 50 \tag{1}$$

$$0.6 < L2w/L3w < 2.5 \tag{2}$$

$$10 < |f1/f23w| < 25 \tag{3}$$

where L2w and L2t denotes air intervals between the second lens unit and the third lens unit at the wide-angle end and at the telephoto end, respectively, L3w denotes an air interval between the third lens unit and the fourth lens unit at the wide-angle end, f1 represents a focal length of the first lens unit, and f23w represents a combined focal length of the second lens unit and the third lens unit at the wide-angle end.

In the zoom lens of each embodiment, refractive powers and moving loci for zooming of the lens units are appropriately set. Here, the conditional expression (1) defines a ratio of an air interval between the second lens unit U2 to the third lens unit U3 at the wide-angle end and the air interval therebetween at the telephoto end. In the zoom lens of each embodiment, when zooming is performed, the air interval L2w between the second lens unit U2 and the third lens unit U3 at the wide-angle end is increased, while the air interval L2t between the second lens unit U2 and the third lens unit U3 at the telephoto end is decreased as illustrated in FIG. 8.

Thus, the third lens unit U3 moves away from an image point of the second lens unit U2 at the wide-angle end. Therefore, a lateral magnification of the third lens unit U3 becomes small so that a shorter focal length (wider angle of field) can be easily achieved. On the other hand, the third lens unit U3 moves close to the image point of the second lens unit U2 at the telephoto end. Therefore, the lateral magnification of the third lens unit U3 becomes large so that a longer focal length (telephoto performance) can be easily achieved. Therefore, a moving distance necessary for magnification-varying can be shortened.

In the zoom lens of each embodiment, this ratio of air interval is appropriately set so that a length of the magnification-varying lens unit can be effectively shortened. When the conditional expression (1) is satisfied, appropriate correction of various aberrations in the whole zoom region can be facilitated while the length of the magnification-varying lens unit is shortened. If L2w/L2t is equal to or smaller than the lower limit of the conditional expression (1), the effect of shortening the magnification-varying lens unit becomes small, so that the total lens length is increased. Therefore, it becomes difficult to achieve a higher zoom ratio. If L2w/L2t is equal to or larger than the upper limit of the conditional expression (1), an incident pupil at the wide-angle end becomes positioned in the image side, so that an effective diameter of the first lens unit U1 is increased. Therefore, it becomes difficult to achieve a wider angle of field. In addition, a larger effect can be obtained by applying the conditional expression (1) to a zoom lens having a high zoom ratio satisfying the conditional expression (2) or the conditional expression (3) described later.

The conditional expression (2) defines a ratio of an air interval between the third lens unit U3 and the fourth lens unit U4 to an air interval between the second lens unit U2 and the third lens unit U3 at the wide-angle end. If L2w/L3w is equal to or smaller than the lower limit of the conditional expression (2), the third lens unit U3 moves close to the aperture stop SP. Therefore, an effective diameter of the fifth lens unit U5 becomes large. If L2w/L3w is equal to or larger than the upper limit of the conditional expression (2), a lateral magnification of the third lens unit U3 becomes large at the wide-angle end, and hence it becomes difficult to achieve a wider angle of field.

The conditional expression (3) defines a ratio of a combined focal length of the second lens unit U2 and the third lens unit U3 at the wide-angle end to a focal length of the first lens unit U1. If |f1/f23w| is equal to or larger than the upper limit of the conditional expression (3), the focal length of the first lens unit U1 becomes relatively long compared to the combined focal length of the second lens unit U2 and the third lens unit U3 at the wide-angle end. Therefore, a diameter of the first lens unit U1 becomes large, and hence it becomes difficult to achieve a wider angle of field. If |f1/f23w| is equal to or smaller than the lower limit of the conditional expression (3), the focal length of the first lens unit U1 becomes relatively short compared to the combined focal length of the second lens unit U2 and the third lens unit U3 at the wide-angle end. Therefore, the magnification of the first lens unit U1 at the telephoto end becomes large, and hence it becomes difficult to correct a spherical aberration and an axial chromatic aberration in the telephoto side. It is more preferred to set value ranges of the conditional expressions (1) to (3) as follows.

$$6 < L2w/L2t < 45 \quad (1a)$$

$$0.7 < L2w/L3w < 2.4 \quad (2a)$$

$$15 < |f1/f23w| < 23 \quad (3a)$$

Through setting of the elements as described above, according to each embodiment, it is possible to obtain a small and light-weight zoom lens having an angle of field of larger than 62 degrees at the wide-angle end and a zoom ratio of 80 or larger, in which aberration is appropriately corrected in the whole zoom region.

A zoom ratio of the zoom lens is denoted by Z. This zoom ratio Z satisfies Z=ft/fw as a matter of course, where fw denotes a focal length at the wide-angle end, and ft denotes a focal length at the telephoto end. The value of this zoom ratio Z is larger than 1 as a matter of course. In this case, it is preferred that the third lens unit U3 pass through a region closer to the image side in the optical axis direction than the position at the wide-angle end for zooming from a zoom position w at the wide-angle end to a zoom position (zoom region) in which a magnification-varying ratio z1a satisfies the following relationship.

$$Z^{0.01} < z1a < Z^{0.30} \quad (4)$$

In other words, at a certain zoom position for zooming from the wide-angle end to the telephoto end, the third lens unit is positioned closer to the image side than a position of the third lens unit at the wide-angle end (a position of the third lens unit at a certain zoom position is closer to the image side than a position of the third lens unit at the wide-angle end). It is preferred to satisfy the above-mentioned conditional expression (4), where zla denotes a magnification-varying ratio of the zoom lens at the certain zoom position relative to the magnification-varying ratio at the wide-angle end. This focal length $f_{z1a}$ is expressed by the following expression:

$$f_{z1a} = fw \times z1a$$

where $f_{z1a}$ denotes the focal length at the "certain zoom position".

Note that, the third lens unit may be positioned closer to the image side than a position of the third lens unit at the wide-angle end in the zoom position other than that according to the above-mentioned conditional expression (4). However, as defined by the conditional expression (4), it is more effective that the third lens unit is positioned closer to the image side than a position at the wide-angle end, between the wide-angle end (vicinity) and an intermediate zoom position (so-called wide middle) between the wide-angle end and a zoom intermediate position. A hatching area illustrated in FIG. 8 indicates a range of potential moving loci during zooming of the third lens unit U3.

When the third lens unit U3 passes within this range, the fourth lens unit U4 has a locus convex toward the object side in the magnification-varying area zla in the wide-angle side.

Thus, the lateral magnification of the fourth lens unit U4 becomes large, and hence a longer focal length is easily achieved. In addition, an off-axis light beam moves close to the optical axis in the first lens unit U1, and hence the effective diameter of the first lens unit U1 is easily decreased. In addition, a variation amount of the off-axis light beam of the first lens unit U1 also becomes small, and hence a variation of a distortion for zooming is also easily suppressed. Further, the moving loci of the third lens unit U3 and the fourth lens unit U4 during zooming can be determined arbitrarily, and hence aberration variations, in particular, a spherical aberration, a field curvature, a coma, and the like, are also easily suppressed.

In each embodiment, it is more preferred to satisfy one or more of the following conditions. The lateral magnifications of the fourth lens unit U4 at the wide-angle end and at the telephoto end are denoted by $\beta 4w$ and $\beta 4t$, respectively. A focal length of the fourth lens unit U4 is denoted by f4. The air interval between the second lens unit U2 and the third lens unit U3 at a zoom position from the wide-angle end to a magnification-varying ratio $Z^{0.75}$ is denoted by $L2z2$, and the air interval between the third lens unit U3 and the fourth lens unit U4 is denoted by $L3z2$. The focal length of the second lens unit U2 is denoted by f2, and a focal length of the third lens unit U3 is denoted by f3.

In this case, it is preferred to satisfy one or more of the following conditions.

$$2.0 < \beta 4t/\beta 4w < 4.5 \quad (5)$$

$$3.7 < f1/f4 < 4.5 \quad (6)$$

$$0.12 < L2z2/L3z2 < 0.25 \quad (7)$$

$$2.5 < |L2w/f2| < 7.0 \quad (8)$$

$$0.1 < f2/f3 < 0.6 \quad (9)$$

The conditional expression (5) defines a zoom ratio (ratio of imaging magnification) of the fourth lens unit U4 from the wide-angle end to the telephoto end. During zooming from the wide-angle end to the telephoto end, the fourth lens unit U4 moves toward the object side, and hence the zoom ratio is easily increased.

The fourth lens unit U4 shares a large part of the magnification-varying action, and hence a higher magnification (higher zoom ratio) is easily achieved. If $\beta 4t/\beta 4w$ is equal to or smaller than the lower limit of the conditional expression (5), it becomes difficult to increase the zoom ratio by the fourth lens unit U4, and hence it becomes difficult to achieve a higher magnification. If $\beta 4t/\beta 4w$ is equal to or larger than the upper limit of the conditional expression (5), a movement amount of the fourth lens unit U4 during zooming becomes large, and hence it becomes difficult to suppress an aberration variation due to magnification-varying. In addition, a larger effect can be obtained by applying the conditional expression (5) to a high-magnification zoom lens satisfying the conditional expression (6).

The conditional expression (6) defines a ratio of the focal lengths between the first lens unit U1 and the fourth lens unit U4. If f1/f4 is equal to or smaller than the lower limit of the conditional expression (6), the focal length of the first lens unit U1 becomes relatively short, and hence it becomes difficult to correct an axial chromatic aberration at the telephoto end. If f1/f4 is equal to or larger than the upper limit of the conditional expression (6) is exceeded, the focal length of the fourth lens unit U4 becomes relatively short, and hence it becomes difficult to suppress an aberration variation due to magnification-varying.

The conditional expression (7) defines a ratio of the air interval $L3z2$ between the third lens unit U3 and the fourth lens unit U4 to the air interval $L2z2$ between the second lens unit U2 and the third lens unit U3 in the telephoto side. Through the appropriate setting of the air intervals, an effective diameter of the fourth lens unit U4 is reduced. If $L2z2/L3z2$ is equal to or smaller than the lower limit of the conditional expression (7), the air interval $L2z2$ becomes small, and hence the lens units may abut against each other when moving fast. If $L2z2/L3z2$ is equal to or larger than the upper limit of the conditional expression (7), the fourth lens unit U4 moves away from the aperture stop SP, and hence the effective diameter increases undesirably.

The conditional expression (8) defines a ratio of the focal length of the second lens unit U2 to the air interval between the second lens unit U2 and the third lens unit U3 at the wide-angle end. Through appropriate setting of the focal length, it becomes easy mainly to achieve a wider angle of field and to correct a distortion at the wide-angle end. If $|L2w/f2|$ is equal to or smaller than the lower limit of the conditional expression (8), the air interval between the second lens unit U2 and the third lens unit U3 at the wide-angle end becomes small, and hence it becomes difficult to achieve a wider angle of field. In addition, an effect of correcting a distortion at the wide-angle end becomes small. If $|L2w/f2|$ is equal to or larger than the upper limit of the conditional expression (8), the air interval between the second lens unit U2 and the third lens unit U3 at the wide-angle end increases, and hence the incident pupil at the wide-angle end becomes positioned in the image side. Therefore, the effective diameter of the first lens unit U1 is increased. In addition, a distortion at the wide-angle end is corrected excessively. In addition, a larger effect can be obtained by applying the conditional expression (8) to a high-magnification zoom lens satisfying the conditional expression (9).

The conditional expression (9) defines a ratio of the focal lengths between the second lens unit U2 and the third lens unit U3. If f2/f3 is equal to or smaller than the lower limit of the conditional expression (9), the focal length of the third lens unit U3 becomes relatively large, and hence it is necessary to increase a movement amount of the third lens unit U3 during zooming in order to suppress an increase of the effective diameter of the first lens unit U1. Therefore, it becomes difficult to suppress an aberration variation due to zooming. If f2/f3 is equal to or larger than the upper limit of the conditional expression (9), the focal length of the second lens unit U2 becomes relatively short, and hence it becomes difficult to suppress an aberration variation due to zooming.

In addition, within a zoom range in which a magnification-varying ratio relative to the magnification-varying ratio at the wide-angle end is larger than $Z^{0.01}$ and smaller than $Z^{0.30}$ (within the zoom region and within the magnification-varying range) of the above-mentioned conditional expression (4), it is preferred that the third lens unit U3 be positioned on the most image side at a position at which a magnification-varying ratio z1b relative to the magnification-varying ratio at the wide-angle end satisfies the following expression.

$$Z^{0.05} < z1b < Z^{0.30} \quad (10)$$

In addition, this magnification-varying ratio z1b can be expressed as a magnification-varying ratio $Z^b$ relative to the magnification-varying ratio at the wide-angle end (Z represents a zoom ratio of the zoom lens from the wide-angle end to the telephoto end). With use of this, within the zoom range in which the magnification-varying ratio relative to the magnification-varying ratio at the wide-angle end is larger than $Z^{0.01}$ and smaller than $Z^{0.30}$ (within the zoom region and within the magnification-varying range), a magnification-varying ratio when the third lens unit moves to (is positioned on) the most image side (reduction side) is represented by $Z^b$. Then, the following expression has the same effect as the above-mentioned conditional expression (10):

$$0.05 < b < 0.30 \tag{11}$$

It is more preferred to set the value ranges of the conditional expressions (5) to (11) as follows.

$$2.1 < \beta 4t/\beta 4w < 4.1 \tag{5a}$$

$$3.8 < f1/f4 < 4.4 \tag{6a}$$

$$0.14 < L2z2/L3z2 < 0.23 \tag{7a}$$

$$2.7 < |L2w/f2| < 6.6 \tag{8a}$$

$$0.15 < f2/f3 < 0.50 \tag{9a}$$

$$Z^{0.10} < z1a < Z^{0.25} \tag{10a}$$

$$0.11 < b < 0.25 \tag{11a}$$

In each embodiment, it is preferred that at least one surface of the third lens unit U3 have an aspherical shape, which facilitates suppression of an aberration variation due to zooming.

Hereinafter, features of a lens configuration of each embodiment are described. The first lens unit U1 corresponds to first to tenth lens surfaces. The second lens unit U2 corresponds to eleventh to fifteenth lens surfaces. The third lens unit U3 corresponds to sixteenth to eighteenth lens surfaces. The fourth lens unit U4 corresponds to nineteenth to twenty-fifth lens surfaces.

During zooming from the wide-angle end to the telephoto end, the second lens unit U2 moves linearly to the image side. The third lens unit U3 moves to the image side, and then moves to the object side, and after that moves to the image side. The fourth lens unit U4 moves to the object side, and then moves to the image side, and after that moves toward the object side.

In Embodiment 1, the eleventh lens surface, the sixteenth lens surface, the twentieth lens surface and the twenty-fifth lens surface have an aspherical shape. The eleventh lens surface corrects a distortion mainly in the wide-angle side. The sixteenth lens surface corrects an off-axial aberration such as a coma in the wide-angle side. The twentieth lens surface also corrects an off-axial aberration such as a coma in the wide-angle side. The twenty-fifth lens surface corrects a spherical aberration in the telephoto side.

As shown in Table 1 below, Numerical Embodiment 1 satisfies all the conditional expressions (1) to (3), (5) to (9) and (11). Embodiment 1 achieves a wider angle of field having a high magnification (zoom ratio) of 80 and an angle of field of 65.8 degrees at the wide-angle end. Further, in the whole zoom region, high optical performance is obtained in which various aberrations are appropriately corrected. In Embodiment 2, the eleventh lens surface, the twentieth lens surface and the twenty-fifth lens surface have an aspherical shape. The eleventh lens surface corrects a distortion mainly in the wide-angle side. The twentieth lens surface also corrects an off-axial aberration such as a coma in the wide-angle side. The twenty-fifth lens surface corrects a spherical aberration in the telephoto side.

As shown in Table 1 below, Numerical Embodiment 2 satisfies all the conditional expressions (1) to (3), (5) to (9) and (11). Embodiment 2 achieves a wider angle of field having a high magnification (zoom ratio) of 120 and an angle of field of 63.4 degrees at the wide-angle end. Further, in the whole zoom region, high optical performance is obtained in which various aberrations are appropriately corrected.

In Embodiment 3, the eleventh lens surface, the sixteenth lens surface, the twentieth lens surface and the twenty-fifth lens surface have an aspherical shape. The eleventh lens surface corrects a distortion mainly in the wide-angle side. The sixteenth lens surface corrects an off-axial aberration such as a coma in the wide-angle side. The twentieth lens surface also corrects an off-axial aberration such as a coma in the wide-angle side. The twenty-fifth lens surface corrects a spherical aberration in the telephoto side.

As shown in Table 1 below, Numerical Embodiment 3 satisfies all the conditional expressions (1) to (3), (5) to (9) and (11). Embodiment 3 achieves a wider angle of field having a high magnification (zoom ratio) of 100 and an angle of field of 60.1 degrees at the wide-angle end. Further, in the whole zoom region, high optical performance is obtained in which various aberrations are appropriately corrected.

As described above, according to each embodiment, the refractive power arrangement of each lens unit, the moving locus of the moving lens unit for varying magnification, and the like are appropriately defined. Thus, it is possible to obtain a zoom lens having a higher zoom ratio of 80 or larger and a wider angle of field of larger than 62 degrees at the wide-angle end, in which various aberrations are appropriately corrected.

FIG. 7 is a schematic diagram of a principal part of an image pickup apparatus (TV camera system) employing the zoom lens of Embodiments 1 to 3 as an image taking optical system. FIG. 7 illustrates a zoom lens 101 according to any one of Embodiments 1 to 3 and a camera 124. The zoom lens 101 is attached removably to the camera 124. The zoom lens 101 is attached to the camera 124 to form an image pickup apparatus 125. The zoom lens 101 includes a first lens unit F, a magnification-varying section LZ, and a fifth lens unit R for imaging. The first lens unit F includes a focus lens unit.

The magnification-varying section LZ includes a second lens unit U2 which moves on the optical axis for magnification-varying, a third lens unit U3 which moves on the optical axis for correcting an image plane variation due to magnification-varying, and the fourth lens unit U4. An aperture stop is represented by SP. The fifth lens unit R includes lens units IE' and IE that are inserted removably into an optical path. Through exchange of the lens units IE' and IE, a focal length range of the whole system of the zoom lens 101 is changed. The zoom lens 101 also includes driving mechanisms 114 and 115, such as helicoids and cams, for driving in the optical axis direction the first lens unit F and the magnification-varying portion LZ, respectively.

The image pickup apparatus 125 includes motors (driving units) 116 to 118 for electrically driving the driving mechanisms 114 and 115 and the aperture stop SP. The image pickup apparatus 125 also includes detectors 119 to 121, such as an encoder, a potentiometer, or a photo-sensor, which are configured to detect the positions of the first lens unit F and the magnification-varying section LZ on the optical axis, and the aperture diameter of the aperture stop SP. In addition, the camera 124 includes a glass block 109, which corresponds to an optical filter or a color separating optical system inside the camera 124. Further, the camera 124 includes a solid-state image pickup element (photoelectric transducer) 110, such as a charge-coupled device (CCD) sensor or a complementary metal-oxide semiconductor (CMOS) sensor. The solid-state image pickup element 110 is configured to receive an object image formed by the zoom lens 101.

Further, central processing units (CPUs) 111 and 122 control various types of driving of the camera 124 and the zoom lens 101, respectively. Through application of the zoom lens according to the present invention to a TV camera as described above, an image pickup apparatus having high optical performance is implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Hereinafter, Numerical Embodiments 1 to 3, corresponding to Embodiments 1 to 3 of the present invention, are described. In each of Numerical Embodiments, "i" represents an order of a surface from the object side, "ri" represents a curvature radius of an i-th surface from the object side, "di" represents an interval between the i-th surface and the (i+1)th surface from the object side, and "ndi" and "vdi" respectively represent a refractive index and an Abbe constant of the i-th optical member. An aspherical surface is represented by "*" next to the surface number. Three surfaces on the most image side are a glass block, such as a filter. Table 1 shows correspondences between each embodiment and the conditional expressions described above. The aspherical shape is expressed in the following condition:

$$X = \frac{H^2/R}{1+\sqrt{1-(1+k)(H/R)^2}} + A4H^4 + A6H^6 + A8H^8$$

where an X axis corresponds to the optical axis, an H axis corresponds to an axis perpendicular to the optical axis, a traveling direction of light corresponds to a positive direction, "R" represents a paraxial curvature radius, "k" represents a conic constant, "A4", "A6" and "A8" each represent an aspherical coefficient, and "e-Z" means "×10$^{-Z}$".

Numerical Embodiment 1

Unit: mm

Surface data

| Surface number | r | d | nd | vd | Effective diameter |
|---|---|---|---|---|---|
| 1 | 4510.137 | 6.00 | 1.83400 | 37.2 | 208.82 |
| 2 | 386.258 | 2.04 | | | 198.71 |
| 3 | 387.498 | 24.63 | 1.43387 | 95.1 | 197.60 |
| 4 | −598.066 | 26.05 | | | 195.41 |
| 5 | 347.758 | 18.51 | 1.43387 | 95.1 | 191.47 |
| 6 | −2469.463 | 0.25 | | | 190.98 |
| 7 | 264.463 | 15.75 | 1.43387 | 95.1 | 186.17 |
| 8 | 1013.679 | 1.20 | | | 184.95 |
| 9 | 185.339 | 15.08 | 1.43875 | 94.9 | 175.47 |
| 10 | 396.880 | (Variable) | | | 173.73 |
| 11* | 3405.114 | 2.50 | 2.00330 | 28.3 | 50.47 |
| 12 | 39.662 | 12.81 | | | 42.87 |
| 13 | −44.916 | 2.20 | 1.81600 | 46.6 | 42.17 |
| 14 | 80.897 | 8.55 | 1.92286 | 18.9 | 44.29 |
| 15 | −105.161 | (Variable) | | | 44.76 |
| 16* | −93.585 | 1.40 | 1.83400 | 37.2 | 46.23 |
| 17 | 105.860 | 5.53 | 1.80809 | 22.8 | 48.71 |
| 18 | −316.463 | (Variable) | | | 49.33 |
| 19 | 252.184 | 10.18 | 1.64000 | 60.1 | 81.85 |
| 20* | −228.879 | 0.50 | | | 82.98 |
| 21 | 109.775 | 16.38 | 1.61800 | 63.3 | 87.58 |
| 22 | −223.204 | 0.20 | | | 87.22 |
| 23 | 76.382 | 2.50 | 1.80518 | 25.4 | 79.89 |
| 24 | 43.716 | 25.10 | 1.43875 | 94.9 | 71.95 |
| 25* | −275.299 | (Variable) | | | 70.33 |
| 26 (Stop) | ∞ | 2.22 | | | 39.71 |
| 27 | −184.939 | 2.00 | 1.81600 | 46.6 | 38.89 |
| 28 | 33.663 | 5.96 | 1.84666 | 23.8 | 36.70 |
| 29 | 145.648 | 7.43 | | | 36.24 |
| 30 | −40.338 | 2.00 | 1.88300 | 40.8 | 35.60 |
| 31 | 355.473 | 10.77 | 1.62041 | 60.3 | 37.61 |
| 32 | −39.923 | 0.20 | | | 39.50 |
| 33 | −200.000 | 8.26 | 1.58913 | 61.1 | 37.47 |
| 34 | −52.891 | 5.84 | | | 37.57 |
| 35 | −177.827 | 2.00 | 1.88300 | 40.8 | 33.75 |
| 36 | 41.220 | 11.33 | 1.51823 | 58.9 | 32.87 |
| 37 | −68.686 | 2.08 | | | 33.06 |
| 38 | −144.000 | 9.34 | 1.48749 | 70.2 | 32.38 |
| 39 | −27.419 | 2.00 | 1.88300 | 40.8 | 32.04 |
| 40 | −63.155 | 5.00 | | | 33.24 |
| 41 | 90.007 | 8.98 | 1.53172 | 48.8 | 33.06 |
| 42 | −56.952 | 10.00 | | | 32.33 |
| 43 | ∞ | 33.00 | 1.60859 | 46.4 | 60.00 |
| 44 | ∞ | 13.20 | 1.51633 | 64.2 | 60.00 |
| 45 | ∞ | 15.01 | | | 60.00 |
| Image plane | ∞ | | | | |

Aspherical surface data

Eleventh surface

K = 1.58985e+003   A4 = 7.83984e−007   A6 = −1.06000e−010
A8 = −9.45365e−014

Sixteenth surface

K = −2.32790e−001   A4 = −2.76169e−008   A6 = −7.84294e−012
A8 = −5.59062e−016

Twentieth surface

K = 1.27345e+000   A4 = 1.63950e−007   A6 = 2.17454e−011
A8 = 7.30290e−015

Twenty-fifth surface

K = −2.29995e+001   A4 = 1.77503e−007   A6 = −6.42303e−011
A8 = −2.46646e−014

Various data
Zoom ratio 80.00

| | Wide angle | Intermediate | Telephoto |
|---|---|---|---|
| Focal length | 8.50 | 76.00 | 680.00 |
| F-number | 1.80 | 1.80 | 3.60 |
| Half angle of field | 32.91 | 4.14 | 0.46 |
| Image height | 5.50 | 5.50 | 5.50 |
| Total lens length | 647.52 | 647.52 | 647.52 |
| d10 | 2.72 | 154.55 | 199.99 |
| d15 | 188.31 | 21.86 | 23.00 |
| d18 | 79.32 | 82.86 | 11.73 |
| d25 | 3.38 | 14.46 | 39.01 |
| Incident pupil position | 128.44 | 982.69 | 6947.69 |
| Exit pupil position | 362.41 | 362.41 | 362.41 |
| Front principal point | 137.15 | 1075.32 | 8958.74 |
| Rear principal point | 6.51 | −60.99 | −664.99 |

Zoom lens unit data

| Unit | Leading surface | Focal length | Lens structure length | Front principal point | Rear principal point |
|---|---|---|---|---|---|
| 1 | 1 | 259.29 | 109.52 | 61.34 | −20.99 |
| 2 | 11 | −30.07 | 26.05 | 2.43 | −17.78 |
| 3 | 16 | −153.45 | 6.93 | −1.48 | −5.34 |
| 4 | 19 | 61.38 | 54.86 | 10.96 | −26.40 |
| 5 | 26 | 57.88 | 161.42 | 69.88 | 25.35 |

Single lens data

-continued

Unit: mm

| Lens | Leading surface | Focal length |
|---|---|---|
| 1 | 1 | −503.64 |
| 2 | 3 | 544.74 |
| 3 | 5 | 702.22 |
| 4 | 7 | 817.43 |
| 5 | 9 | 773.69 |
| 6 | 11 | −39.68 |
| 7 | 13 | −34.94 |
| 8 | 14 | 50.05 |
| 9 | 16 | −58.99 |
| 10 | 17 | 97.74 |
| 11 | 19 | 188.29 |
| 12 | 21 | 120.90 |
| 13 | 23 | −130.26 |
| 14 | 24 | 87.88 |
| 15 | 27 | −34.58 |
| 16 | 28 | 49.98 |
| 17 | 30 | −40.69 |
| 18 | 31 | 58.23 |
| 19 | 33 | 119.10 |
| 20 | 35 | −37.52 |
| 21 | 36 | 51.32 |
| 22 | 38 | 67.46 |
| 23 | 39 | −56.03 |
| 24 | 41 | 66.70 |
| 25 | 43 | 0.00 |
| 26 | 44 | 0.00 |

Numerical Embodiment 2

Unit: mm

Surface data

| Surface number | r | d | nd | vd | Effective diameter |
|---|---|---|---|---|---|
| 1 | 6797.000 | 6.00 | 1.83400 | 37.2 | 207.52 |
| 2 | 367.805 | 2.42 | | | 197.85 |
| 3 | 379.349 | 24.10 | 1.43387 | 95.1 | 196.95 |
| 4 | −652.261 | 26.83 | | | 195.51 |
| 5 | 354.070 | 20.99 | 1.43387 | 95.1 | 199.14 |
| 6 | −1434.293 | 0.25 | | | 198.74 |
| 7 | 243.953 | 19.68 | 1.43387 | 95.1 | 193.03 |
| 8 | 1387.395 | 1.20 | | | 191.73 |
| 9 | 202.636 | 12.33 | 1.49700 | 81.5 | 181.09 |
| 10 | 352.007 | (Variable) | | | 179.30 |
| 11* | 15000.000 | 2.50 | 2.00330 | 28.3 | 56.18 |
| 12 | 45.832 | 12.07 | | | 48.50 |
| 13 | −74.861 | 2.20 | 1.81600 | 46.6 | 47.97 |
| 14 | 59.421 | 9.05 | 1.95906 | 17.5 | 48.80 |
| 15 | −363.430 | (Variable) | | | 48.80 |
| 16 | −94.807 | 1.40 | 1.88300 | 40.8 | 40.48 |
| 17 | 167.289 | 3.11 | 1.92286 | 18.9 | 42.33 |
| 18 | −1114.818 | (Variable) | | | 42.89 |
| 19 | 110.111 | 14.00 | 1.61800 | 63.3 | 85.19 |
| 20* | −398.181 | 0.50 | | | 85.40 |
| 21 | 233.515 | 12.05 | 1.61800 | 63.3 | 85.89 |
| 22 | −201.708 | 0.20 | | | 85.58 |
| 23 | 80.197 | 2.50 | 1.84666 | 23.8 | 78.99 |
| 24 | 47.337 | 24.09 | 1.43875 | 94.9 | 72.39 |
| 25* | −275.299 | (Variable) | | | 70.50 |
| 26 (Stop) | ∞ | 3.08 | | | 44.28 |
| 27 | −226.596 | 2.00 | 1.81600 | 46.6 | 42.91 |
| 28 | 35.122 | 7.00 | 1.84666 | 23.8 | 40.47 |
| 29 | 187.471 | 7.81 | | | 40.01 |
| 30 | −44.599 | 2.00 | 1.88300 | 40.8 | 39.28 |
| 31 | 169.074 | 10.58 | 1.62041 | 60.3 | 41.53 |
| 32 | −45.782 | 15.88 | | | 43.02 |
| 33 | −200.000 | 4.83 | 1.58913 | 61.1 | 42.44 |
| 34 | −52.891 | 9.81 | | | 42.53 |
| 35 | −559.275 | 2.00 | 1.88300 | 40.8 | 36.18 |
| 36 | 44.820 | 11.02 | 1.51823 | 58.9 | 34.98 |
| 37 | −105.068 | 5.00 | | | 34.66 |
| 38 | −191.981 | 9.38 | 1.48749 | 70.2 | 33.17 |
| 39 | −29.504 | 2.00 | 1.88300 | 40.8 | 32.57 |
| 40 | −74.257 | 5.00 | | | 33.50 |
| 41 | 95.400 | 8.71 | 1.53172 | 48.8 | 33.01 |
| 42 | −60.951 | 10.00 | | | 32.19 |
| 43 | ∞ | 33.00 | 1.60859 | 46.4 | 60.00 |
| 44 | ∞ | 13.20 | 1.51633 | 64.2 | 60.00 |
| 45 | ∞ | 15.03 | | | 60.00 |
| Image plane | ∞ | | | | |

Aspherical surface data

Eleventh surface $K = -1.24229e+005$   $A4 = 2.90067e-007$   $A6 = -9.81776e-012$
$A8 = -5.64727e-014$ Twentieth surface $K = 3.78386e+001$   $A4 = 3.98687e-007$   $A6 = 1.73564e-011$
$A8 = 4.79169e-015$ Twenty-fifth surface $K = -3.07345e+001$   $A4 = -4.64714e-008$   $A6 = 3.29116e-011$
$A8 = -2.58957e-014$ Various data
Zoom ratio 120.00

| | Wide angle | Intermediate | Telephoto |
|---|---|---|---|
| Focal length | 8.90 | 97.00 | 1068.00 |
| F-number | 1.80 | 1.80 | 5.50 |
| Half angle of field | 31.72 | 3.25 | 0.30 |
| Image height | 5.50 | 5.50 | 5.50 |
| Total lens length | 662.83 | 662.83 | 662.83 |
| d10 | 2.90 | 165.20 | 200.17 |
| d15 | 180.11 | 4.84 | 4.17 |
| d18 | 101.65 | 106.74 | 2.66 |
| d25 | 3.38 | 11.25 | 81.04 |
| Incident pupil position | 136.14 | 1205.90 | 10437.49 |
| Exit pupil position | 1056.13 | 1056.13 | 1056.13 |
| Front principal point | 145.11 | 1311.94 | 12601.07 |
| Rear principal point | 6.13 | −81.98 | −1052.97 |

Zoom lens unit data

| Unit | Leading surface | Focal length | Lens structure length | Front principal point | Rear principal point |
|---|---|---|---|---|---|
| 1 | 1 | 261.09 | 113.79 | 65.92 | −18.61 |
| 2 | 11 | −34.93 | 25.83 | 2.94 | −16.01 |
| 3 | 16 | −121.45 | 4.51 | −0.26 | −2.62 |
| 4 | 19 | 65.77 | 53.34 | 10.65 | −25.89 |
| 5 | 26 | 73.46 | 162.30 | 79.10 | 25.51 |

Single lens data

| Lens | Leading surface | Focal length |
|---|---|---|
| 1 | 1 | −463.48 |
| 2 | 3 | 555.37 |
| 3 | 5 | 655.19 |
| 4 | 7 | 676.99 |
| 5 | 9 | 932.43 |
| 6 | 11 | −45.45 |
| 7 | 13 | −40.09 |
| 8 | 14 | 53.11 |
| 9 | 16 | −67.96 |

-continued

Unit: mm

| | | |
|---|---|---|
| 10 | 17 | 155.87 |
| 11 | 19 | 140.53 |
| 12 | 21 | 176.33 |
| 13 | 23 | −140.03 |
| 14 | 24 | 93.97 |
| 15 | 27 | −36.95 |
| 16 | 28 | 49.50 |
| 17 | 30 | −39.56 |
| 18 | 31 | 58.95 |
| 19 | 33 | 120.12 |
| 20 | 35 | −46.65 |
| 21 | 36 | 61.94 |
| 22 | 38 | 69.94 |
| 23 | 39 | −56.30 |
| 24 | 41 | 70.98 |
| 25 | 43 | 0.00 |
| 26 | 44 | 0.00 |

Numerical Embodiment 3

Unit: mm

Surface data

| Surface number | r | d | nd | vd | Effective diameter |
|---|---|---|---|---|---|
| 1 | 3898.065 | 6.00 | 1.83400 | 37.2 | 205.01 |
| 2 | 370.092 | 2.42 | | | 196.12 |
| 3 | 381.758 | 22.91 | 1.43387 | 95.1 | 195.27 |
| 4 | −734.835 | 28.49 | | | 194.90 |
| 5 | 352.903 | 22.80 | 1.43387 | 95.1 | 198.34 |
| 6 | −916.931 | 0.25 | | | 197.93 |
| 7 | 238.753 | 17.88 | 1.43387 | 95.1 | 190.74 |
| 8 | 895.901 | 1.20 | | | 189.36 |
| 9 | 203.791 | 10.74 | 1.49700 | 81.5 | 179.73 |
| 10 | 318.423 | (Variable) | | | 177.96 |
| 11* | 2574.454 | 2.50 | 2.00330 | 28.3 | 62.48 |
| 12 | 55.822 | 12.85 | | | 54.91 |
| 13 | −85.716 | 2.20 | 1.81600 | 46.6 | 54.28 |
| 14 | 67.759 | 9.64 | 1.92286 | 18.9 | 54.78 |
| 15 | −276.494 | (Variable) | | | 54.75 |
| 16* | −89.114 | 1.40 | 1.83400 | 37.2 | 42.10 |
| 17 | 115.355 | 3.24 | 1.95906 | 17.5 | 44.17 |
| 18 | 1126.728 | (Variable) | | | 44.55 |
| 19 | 108.424 | 12.82 | 1.61800 | 63.3 | 86.81 |
| 20* | −1441.652 | 0.50 | | | 86.86 |
| 21 | 259.848 | 11.16 | 1.72916 | 54.7 | 87.28 |
| 22 | −232.025 | 0.20 | | | 87.01 |
| 23 | 79.445 | 2.50 | 1.84666 | 23.8 | 80.34 |
| 24 | 47.164 | 23.72 | 1.43875 | 94.9 | 73.41 |
| 25* | −275.299 | (Variable) | | | 71.91 |
| 26 (Stop) | ∞ | 2.56 | | | 42.96 |
| 27 | −179.197 | 2.00 | 1.81600 | 46.6 | 42.06 |
| 28 | 34.001 | 7.16 | 1.84666 | 23.8 | 39.73 |
| 29 | 211.160 | 7.49 | | | 39.29 |
| 30 | −44.443 | 2.00 | 1.88300 | 40.8 | 38.58 |
| 31 | 139.879 | 10.76 | 1.62041 | 60.3 | 40.80 |
| 32 | −42.870 | 19.85 | | | 42.22 |
| 33 | −200.000 | 4.50 | 1.58913 | 61.1 | 40.64 |
| 34 | −53.256 | 3.51 | | | 40.69 |
| 35 | −3013.124 | 2.00 | 1.88300 | 40.8 | 37.20 |
| 36 | 43.281 | 11.06 | 1.51823 | 58.9 | 35.80 |
| 37 | −108.015 | 5.00 | | | 35.34 |
| 38 | −247.872 | 9.43 | 1.48749 | 70.2 | 33.58 |
| 39 | −30.702 | 2.00 | 1.88300 | 40.8 | 32.78 |
| 40 | −89.700 | 5.00 | | | 33.53 |
| 41 | 98.240 | 8.68 | 1.53172 | 48.8 | 33.04 |
| 42 | −60.625 | 10.00 | | | 32.23 |
| 43 | ∞ | 33.00 | 1.60859 | 46.4 | 60.00 |
| 44 | ∞ | 13.20 | 1.51633 | 64.2 | 60.00 |
| 45 | ∞ | 15.02 | | | 60.00 |
| Image plane | ∞ | | | | |

-continued

Unit: mm

Aspherical surface data

Eleventh surface

K = 1.64434e+003  A4 = 1.46282e−007  A6 = 3.88377e−011
A8 = −3.91648e−014

Sixteenth surface

K = 1.90375e−001  A4 = 3.35748e−008  A6 = −8.83602e−011
A8 = 2.70836e−014

Twentieth surface

K = 3.21413e+002  A4 = 2.66554e−007  A6 = 2.30806e−011
A8 = −3.06588e−016

Twenty-fifth surface

K = −5.77270e+001  A4 = −1.23956e−007  A6 = 4.27240e−011
A8 = −3.05595e−014

Various data
Zoom ratio 100.00

| | Wide angle | Intermediate | Telephoto |
|---|---|---|---|
| Focal length | 9.50 | 95.00 | 950.00 |
| F-number | 1.80 | 1.80 | 4.90 |
| Half angle of field | 30.07 | 3.31 | 0.33 |
| Image height | 5.50 | 5.50 | 5.50 |
| Total lens length | 665.45 | 665.45 | 665.45 |
| d10 | 2.92 | 159.44 | 200.19 |
| d15 | 129.68 | 4.36 | 10.00 |
| d18 | 159.81 | 114.16 | 4.34 |
| d25 | 3.38 | 17.83 | 81.27 |
| Incident pupil position | 145.08 | 1056.88 | 8758.51 |
| Exit pupil position | 2110.16 | 2110.16 | 2110.16 |
| Front principal point | 154.62 | 1156.18 | 10139.27 |
| Rear principal point | 5.52 | −79.98 | −934.98 |

Zoom lens unit data

| Unit | Leading surface | Focal length | Lens structure length | Front principal point | Rear principal point |
|---|---|---|---|---|---|
| 1 | 1 | 268.50 | 112.69 | 65.83 | −18.72 |
| 2 | 11 | −44.23 | 27.19 | 2.70 | −17.65 |
| 3 | 16 | −109.39 | 4.64 | 0.13 | −2.27 |
| 4 | 19 | 68.21 | 50.90 | 9.73 | −24.61 |
| 5 | 26 | 74.55 | 159.21 | 77.32 | 27.16 |

Single lens data

| Lens | Leading surface | Focal length |
|---|---|---|
| 1 | 1 | −487.57 |
| 2 | 3 | 581.22 |
| 3 | 5 | 589.07 |
| 4 | 7 | 742.21 |
| 5 | 9 | 1101.36 |
| 6 | 11 | −56.43 |
| 7 | 13 | −45.85 |
| 8 | 14 | 59.05 |
| 9 | 16 | −59.71 |
| 10 | 17 | 132.02 |
| 11 | 19 | 163.08 |
| 12 | 21 | 169.00 |
| 13 | 23 | −140.78 |
| 14 | 24 | 93.65 |
| 15 | 27 | −34.70 |
| 16 | 28 | 46.53 |
| 17 | 30 | −37.78 |
| 18 | 31 | 53.90 |

-continued

Unit: mm

| 19 | 33 | 121.34 |
| --- | --- | --- |
| 20 | 35 | −48.03 |
| 21 | 36 | 60.91 |
| 22 | 38 | 70.63 |
| 23 | 39 | −53.41 |
| 24 | 41 | 71.53 |
| 25 | 43 | 0.00 |
| 26 | 44 | 0.00 |

TABLE 1

Corresponding values of conditional expressions in Numerical Embodiments 1 to 3

| | | Embodiment 1 | Embodiment 2 | Embodiment 3 |
| --- | --- | --- | --- | --- |
| | Wide-angle end focal length | 8.50 | 8.90 | 9.50 |
| | Telephoto end focal length | 680.00 | 1068.00 | 950.00 |
| | Zoom magnification | 80.00 | 120.00 | 100.00 |
| | $Z^{0.01}$ | 1.04 | 1.05 | 1.05 |
| | $Z^{0.30}$ | 3.72 | 4.20 | 3.98 |
| | $Z^{0.75}$ | 26.75 | 36.26 | 31.62 |
| | L2w | 188.31 | 180.11 | 129.68 |
| | L2t | 23.00 | 4.17 | 10.00 |
| | L3w | 79.32 | 101.65 | 159.81 |
| | L2z2 | 9.32 | 9.40 | 9.29 |
| | L3z2 | 47.36 | 50.32 | 58.05 |
| | f1 | 259.29 | 261.09 | 268.50 |
| | f2 | −30.7 | −34.93 | −44.23 |
| | f3 | −153.45 | −121.45 | −109.39 |
| | f4 | 61.38 | 65.77 | 68.21 |
| | f23w | −11.89 | −12.04 | −16.07 |
| | β4w | −0.48 | −0.51 | −0.39 |
| | β4t | −1.06 | −1.69 | −1.53 |
| Conditional expression (1) | L2w/L2t | 8.19 | 43.17 | 12.97 |
| Conditional expression (2) | L2w/L3w | 2.37 | 1.77 | 0.81 |
| Conditional expression (3) | \|f1/f23w\| | 21.81 | 21.68 | 16.71 |
| Conditional expression (5) | β4t/β4w | 2.21 | 3.32 | 3.92 |
| Conditional expression (6) | f1/f4 | 4.22 | 3.97 | 3.94 |
| Conditional expression (7) | L2z2/L3z2 | 0.20 | 0.19 | 0.16 |
| Conditional expression (8) | \|L2w/f2\| | 6.26 | 5.16 | 2.93 |
| Conditional expression (9) | f2/f3 | 0.20 | 0.29 | 0.40 |
| Conditional expression (11) | b | 0.169 | 0.162 | 0.209 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-090965, filed Apr. 15, 2011, which is hereby incorporated by reference herein in its entirety.

What is claimed is:

1. A zoom lens, comprising, in order from an object side to an image side:
a first lens unit having a positive refractive power which does not move for zooming;
a second lens unit having a negative refractive power which moves during zooming;
a third lens unit having a negative refractive power which moves during zooming;
a fourth lens unit having a positive refractive power which moves during zooming; and
a fifth lens unit having a positive refractive power which does not move for zooming,
wherein the following conditions are satisfied:

$5 < L2w/L2t < 50;$ $0.6 < L2w/L3w < 2.5;$ and $10 < |f1/f23w| < 25,$ where L2w and L2t represent air intervals between the second lens unit and the third lens unit at a wide-angle end and at a telephoto end, respectively, L3w represents an air interval between the third lens unit and the fourth lens unit at the wide-angle end, f1 represents a focal length of the first lens unit, and f23w represents a combined focal length of the second lens unit and the third lens unit at the wide-angle end.

2. A zoom lens according to claim 1, wherein the third lens unit passes through a range positioned closer to the image side in an optical axis direction than a position at the wide-angle end during zooming in a zoom region in which the following expression is satisfied:

$Z^{0.01} < z1a < Z^{0.30},$ where Z represents a zoom ratio of the zoom lens and z1a represents a magnification-varying ratio relative to that at the wide-angle end.

3. A zoom lens according to claim 1, wherein the following conditions are satisfied:

$$2.0 < \beta 4t/\beta 4w < 4.5; \text{ and}$$

$$3.7 < f1/f4 < 4.5,$$

where β4w and β4t represent lateral magnifications of the fourth lens unit at the wide-angle end and at the telephoto end, respectively, and f4 represents a focal length of the fourth lens unit.

4. A zoom lens according to claim 1, wherein the following condition is satisfied:

$$0.12 < L2z2/L3z2 < 0.25,$$

where Z represents a zoom ratio of the zoom lens, L2z2 represents an air interval between the second lens unit and the third lens unit at a zoom position of a magnification-varying ratio $Z^{0.75}$ relative to a magnification-varying ratio at the wide-angle end, and L3z2 represents an air interval between the third lens unit and the fourth lens unit at the zoom position of the magnification-varying ratio $Z^{0.75}$ relative to the magnification-varying ratio at the wide-angle end.

5. A zoom lens according to claim 1, wherein the following conditions are satisfied:

$$2.5 < |L2w/f2| < 7.0; \text{ and}$$

$$0.1 < f2/f3 < 0.6,$$

where f2 represents a focal length of the second lens unit, and f3 represents a focal length of the third lens unit.

6. A zoom lens according to claim 1, wherein, during zooming from the wide-angle end to the telephoto end:
the third lens unit moves to the image side and then moves to the object side, and then moves to the image side; and
the fourth lens unit moves to the object side and then moves to the image side, and then moves to the object side.

7. A zoom lens according to claim 1, wherein, when a zoom ratio of the zoom lens is represented by Z, and in a zoom region in which a magnification-varying ratio relative to a magnification-varying ratio at the wide-angle end is $Z^{0.01}$ to $Z^{0.30}$, a magnification-varying ratio relative to the magnification-varying ratio at the wide-angle end at a zoom position in which the third lens unit is on the most image side is represented by $Z^b$, the following condition is satisfied:

$$0.05 < b < 0.30.$$

8. An image pickup apparatus, comprising:
A zoom lens, including, in order from an object side to an image side:
a first lens unit having a positive refractive power which does not move for zooming;
a second lens unit having a negative refractive power which moves during zooming;
a third lens unit having a negative refractive power which moves during zooming;
a fourth lens unit having a positive refractive power which moves during zooming; and
a fifth lens unit having a positive refractive power which does not move for zooming,
wherein the following conditions are satisfied:

$$5 < L2w/L2t < 50;$$

$$0.6 < L2w/L3w < 2.5; \text{ and}$$

$$10 < |f1/f23w| < 25,$$

where L2w and L2t represent air intervals between the second lens unit and the third lens unit at a wide-angle end and at a telephoto end, respectively, L3w represents an air interval between the third lens unit and the fourth lens unit at the wide-angle end, f1 represents a focal length of the first lens unit, and f23w represents a combined focal length of the second lens unit and the third lens unit at the wide-angle end; and
a solid-state image pickup element for receiving an image formed by the zoom lens.

* * * * *